J. E. BURTON.
DRAG ATTACHMENT FOR PLOWS.
APPLICATION FILED NOV. 14, 1910.
998,838.
Patented July 25, 1911.
2 SHEETS—SHEET 1.
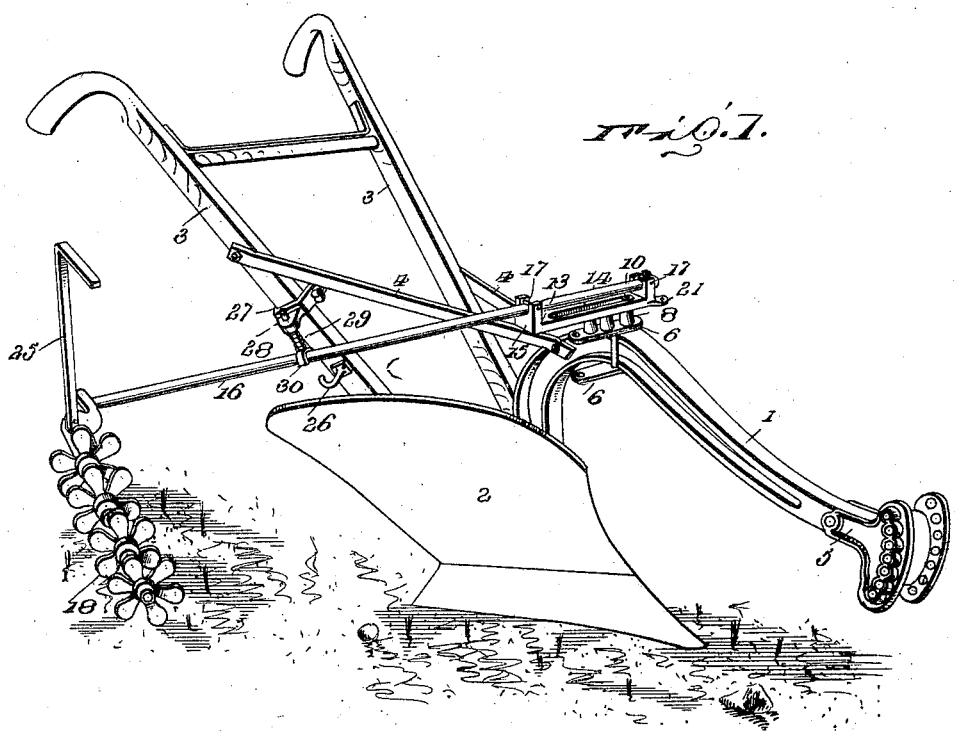
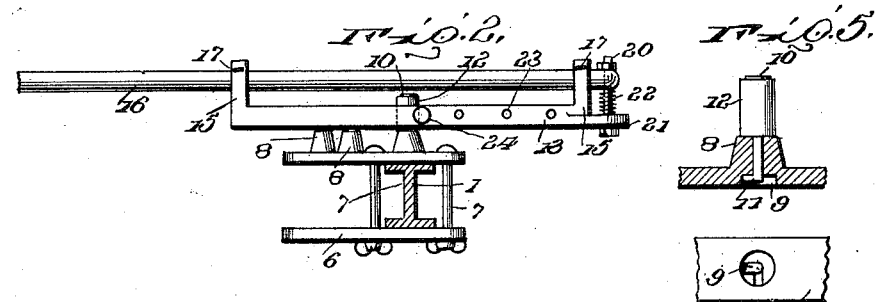
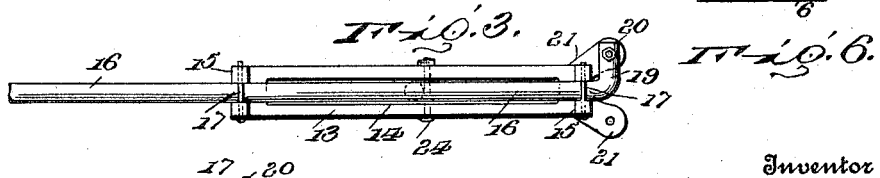
Witnesses
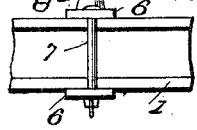
Inventor
J. E. Burton
By H. A. K. Hacey, Attorneys J. E. BURTON.
DRAG ATTACHMENT FOR PLOWS.
APPLICATION FILED NOV. 14, 1910.
998,838.
Patented July 25, 1911.
2 SHEETS—SHEET 2.
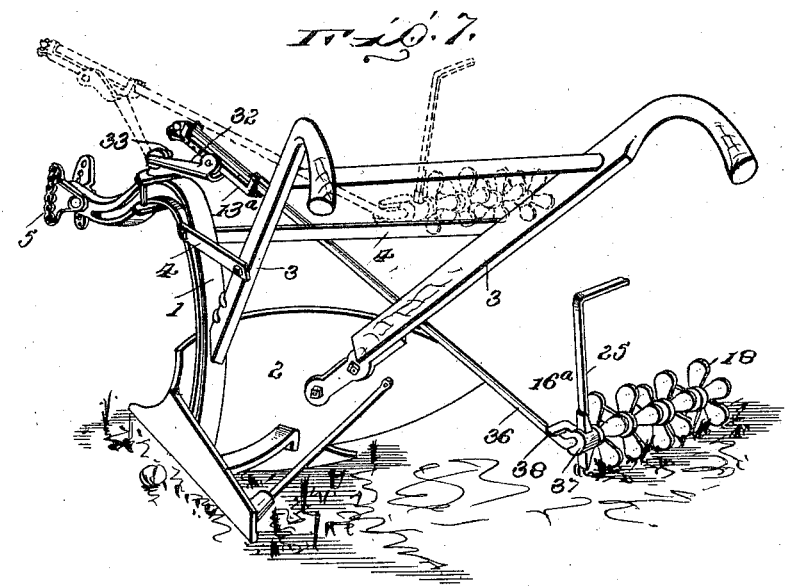
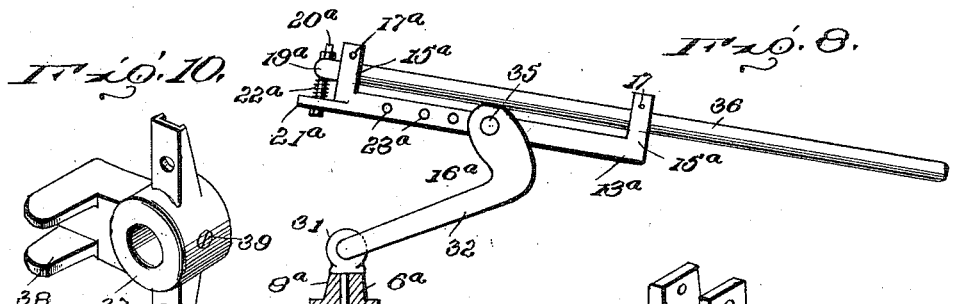
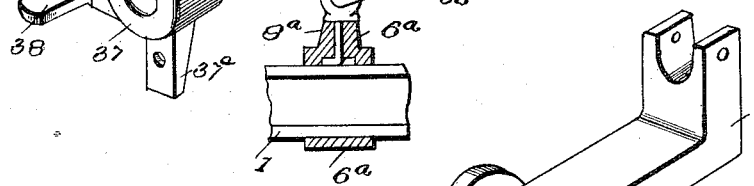
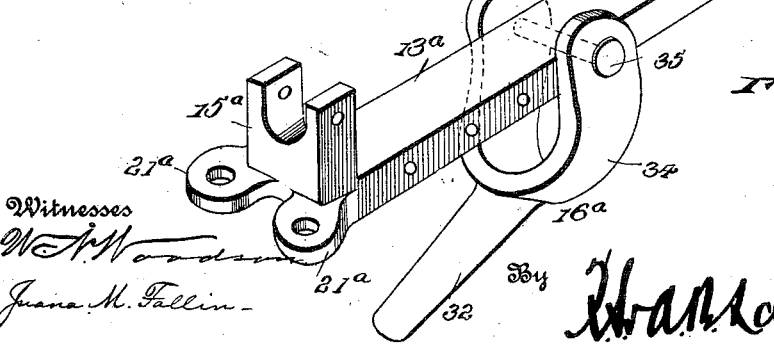
Inventor
J. E. Burton
Witnesses
By
Attorneys.

ly to Figs. 1 to 6 inclusive, the nu-
UNITED STATES PATENT OFFICE.

JAMES E. BURTON, OF WHITEWATER, WISCONSIN.

DRAG ATTACHMENT FOR PLOWS.

998,838. Specification of Letters Patent. Patented July 25, 1911.

Application filed November 14, 1910. Serial No. 582,400.

*To all whom it may concern:*

Be it known that I, JAMES E. BURTON, a citizen of the United States, residing at Whitewater, in the county of Walworth and State of Wisconsin, have invented certain new and useful Improvements in Drag Attachments for Plows, of which the following is a specification.

This invention comprehends certain new and useful improvements in drag attachments for plows of the walking type, and the invention has for its primary object a simple, durable and efficient construction of device of this character in which the pulverizer or other drag implement will swing free at the rear of the plow and close to the same, laterally considered, whereby it will not tend to tilt the plow or influence the direct draft thereof.

The invention also has for one of its main objects to provide a drag attachment in which the device supporting the drag may be permitted to have a slight lateral yielding movement, axially considered, so as to avoid any undue strain upon the parts of the drag attachment, or upon the plow itself, or the hands of the operator grasping the handles of the plow.

The invention also has for its object a simple device of this character by the use of which the drag device may be held at the left-hand side or right-hand side of the plow with equal facility. And the invention further aims to generally improve this class of devices and to make them more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view of one form or embodiment of my invention, illustrating it in an operative relation to a walking plow of conventional type; Fig. 2 is a fragmentary side view of the forward portion of the drag supporting rod and its correlated parts; Fig. 3 is a top plan view thereof; Fig. 4 is an end view thereof; Figs. 5 and 6 are detail fragmentary views of a form of clamping bar which may be employed; Fig. 7 is a rear perspective view of another embodiment of my invention, illustrating the drag device in an operative position in full lines and in an inoperative position in dotted lines; Fig. 8 is a side elevation of a portion of this embodiment of the invention, a part being shown in section; Fig. 9 is an enlarged detail perspective view of a part of this modification; and, Fig. 10 is a detail perspective view of a device which may be employed to secure in place the drag manipulating handle.

Corresponding and like parts are referred to in the following description and indicated in all the views of the drawings by the same reference characters.

Referring to the drawings and now particularly to Figs. 1 to 6 inclusive, the numeral 1 designates the beam, 2 the mold board, 3 the handles, 4 the handle braces, and 5 the clevis of a walking plow which may be of any desired conventional construction or design.

In carrying out my invention, I preferably secure to the beam 1 of the plow, upper and lower clamping bars 6 secured in place at any desired point along the length of the beam by means of tie bolts 7. The upper clamping bar 6 is preferably formed with a transversely extending series of upwardly projecting bosses 8, said bosses being formed with bayonet slots 9 leading to annular recesses, whereby there may be secured to any of the bosses a pin or post 10 formed with an angularly disposed lower end 11, so that the pin or post may be easily inserted in and detached from the boss and be securely held against accidental displacement. A roller 12 is preferably journaled on the post. By means of this laterally extending series of bosses 8 and the detachable arrangement of the post 10, the latter may be shifted from one boss to another so as to vary the line of draft of the drag devices hereinafter specifically described, and the angular position thereof.

13 designates a frame which is formed with a longitudinally extending slot 14 by which it is mounted for a longitudinally slidable, turning and tilting movement on the post 10, friction being reduced by means of the roller 12 designed to directly engage the side walls of the slot. The ends of the frame 13 are projected upwardly, as indicated at 15, and are recessed in their upper extremities to form seats for a drag supporting rod 16, said rod being insured against displacement from the recesses of the upturned ends 15 by means of cotter pins 17, as clearly illustrated in the drawings. The rear end of the rod or bar 16 is connected to and designed to directly support a drag device 18 which may manifestly be in the nature of a pulverizer, harrow of any type, or any other desired drag. The forward end of the rod 16 is bent laterally, as indicated at 19 in advance of the frame 13, and a bolt 20 is designed to extend through the laterally projecting forward end 19 of the rod, and also through one of a pair of laterally spaced and forwardly projecting ears 21 formed on the forward end of the frame 13. A compression spring 22 encircles the bolt 20 and is designed to bear against the laterally projecting end 19 and to react against the subjacent ear 21, so as to permit the rod 16 to have a limited turning movement about its longitudinal axis, thereby relieving from the plow, to a considerable extent, the lateral strain that may be imposed upon the drag device. By providing a pair of these ears 21 it is obvious that the device may be arranged at either the right-hand or left-hand of the plow, the rod 16 being reversed axially and the bolt 20 passing through the end 19 and the then subjacent ear 21.

In order to adjust the drag device forwardly or rearwardly alongside of the plow, the frame 13 is formed with any desired number of transversely extending apertures 23, so that a bolt 24 may be passed through corresponding apertures on opposite sides of the slots 14 and thereby limit the relatively rearward movement of the rod 16 and frame as regards the post 10 which sustains directly the draft of the drag.

A handle 25 is connected to the rear end of the drag supporting rod 16 and projects upwardly therefrom, whereby the operator may easily lift the rear end of the rod and raise the drag, and by sliding the rod and frame 13 forwardly and by moving the rear end of the rod and drag upwardly and inwardly, the drag may be easily supported in an inoperative position on the handles 3, where it will be out of the way and its weight will be properly distributed on the plow and not tend to laterally overbalance the latter.

Preferably one of the handles 3 carries a laterally projecting hook 26 which normally lies underneath and spaced from the rod 16 in the operative position of said rod, so as to limit the downward movement of the rod, should the drag device be unduly lowered for any reason, thereby catching the rod and preventing it from striking the mold board 2, for it is to be understood that in the preferred arrangement of the drag, the same will lie close behind the mold board and will avoid any side draft or influencing of the plow. If desired, I may secure to one of the handles 3, above the rod 16, a clip 27 provided with an apertured lug 28 in which a downwardly spring pressed stem 29 works, said stem being formed, as by a recessed lower end 30, to engage the rod 16 and prevent the drag from jumping up. It is to be noted that in the normal incompressed or untensioned position of the stem 29, a space will be left between the lower end of the latter and the hook 26, whereby the rod may be easily disengaged from the stem in the operation of swinging the rod at its rear end upwardly and inwardly so as to rest the drag 18 upon the handles 3. I do not regard this spring device as essential, but it may be found useful under some circumstances.

It is to be understood that my invention is not limited to the construction, arrangements and proportions of the parts illustrated in Figs. 1 to 6 of the drawing, but that various changes may be made without departing from the scope of the invention as defined in the appended claims. For instance, another embodiment of the invention is illustrated in Figs. 7, 8 and 9, where $6^a$ designates the clamping bars adapted to be secured to the beam of a plow, the upper bar being formed with one or more bayonet slotted bosses $8^a$ to which a transversely apertured eye 31 is detachably connected for a turning movement about a substantially vertical axis. In this embodiment of the invention now being referred to, the drag supporting rod or bar, here designated $16^a$, is constructed in hingedly connected sections, the foremost one of which is designated 32, the same being formed with a laterally projecting end 33 adapted to be slipped into the eye 31 for a rocking movement therein. The opposite end of the section 32 is forked, as indicated at 34 to accommodate the frame $13^a$, said frame being formed with any desired number of transversely extending apertures $23^a$ to receive a bolt 35 which connects the frame with the forked end of the section. The frame $13^a$ is substantially identical in function and purpose with the frame 13 before described, and is provided with upturned ends $15^a$ formed with recesses in which the rear section 36 of the drag supporting rod is mounted. This last named section is formed with a laterally extending forward end $19^a$, and a bolt $20^a$ is adapted to pass through said end and through either one of a pair of apertured ears $21^a$ projecting forwardly from the front end of the frame $13^a$, said ears being arranged in laterally spaced relation to each other, as best illustrated in Fig. 9. By the provision of the two ears, just as in the case of the embodiment first described, the rod 36 may be reversed axially according as it is desired to support the drag device 18 at the right-hand side or left-hand side of the plow. The spring 22ª encircling the bolt 20ª, permits the rod 36 to have a limited turning movement about its longitudinal axis just as has heretofore been described in connection with the rod 16.

The operative position of that form of the invention illustrated in Figs. 7, 8 and 9 is shown in full lines in Fig. 7, and in order to raise the drag 18 and rest it in an operative position, it is only necessary for the operator to grasp the handle 25 and push forwardly on the rod section 36, the jointed connection between the frame 13ª which holds the section 36 in place by means of the bolt 20ª and cotter pin 17ª or the like, and the section 32, and the jointed connection between the section 32 and the eye 31, permitting the drag device 18 to be moved forwardly and thence swung inwardly over the handles of the plow, the parts being then in their inoperative position, illustrated in dotted lines in Fig. 7.

In order to secure the handle 25 in place (and this applies to any form of my invention) I may secure said handle, preferably by a single bolt, to either one of a pair of recessed lugs 37ª extending upwardly and downwardly from a collar 37 adapted to be slipped over the rear laterally extending end of the drag supporting rod, said collar being formed with upper and lower spaced laterally projecting lugs 38 adapted to extend over and underneath the main part of the rod at the rear end of the latter, so as to assist in rigidly connecting the handle to the rod. If desired the collar 37 may be secured to the rod by a set screw 39.

From the foregoing description in connection with the accompanying drawings, it will be seen that I have provided a very simple, durable and efficient construction of drag attachment for plows, whereas the drag will be freely and loosely supported in its operative position, and, lying so close to the plow, back of the mold board thereof, will not influence the motion of the plow, while in the inoperative position of the drag, it will be supported in a position where it will not tend to unduly tilt or overbalance the plow laterally.

Having thus described the invention, what is claimed as new is:

1. A drag attachment for plows, comprising a support, a frame carried by said support, a rod mounted for an axially turning movement in the frame, a drag device carried by said rod, and means for limiting the axial movement of the rod, the frame being mounted for a movement on the support in a direction in line with the length of the rod.

2. A drag attachment for plows, embodying a support, a frame carried by said support and formed with upturned ends, said ends being recessed, a drag rod held to turn in said recesses, the frame being provided with an apertured ear and the rod being provided with a laterally turned end, a spring pressed bolt passing through the end of the rod and ear, and a drag device carried by said rod.

3. A drag attachment for plows, embodying a support, a frame carried by said support and formed with upturned recessed ends, a drag rod mounted in the recesses of said ends and provided with a laterally projecting end, the frame being formed with right and left ears, said ears being apertured, a spring pressed bolt adapted to yieldingly connect the laterally turned end of the rod with either one of said ears, and a drag device carried by said rod.

4. The combination with a plow, embodying a beam, of a rod support secured to said beam, a drag rod operatively connected to said support and capable of moving forwardly from behind the mold board of the plow and upwardly and inwardly, a drag device carried by said support and adapted to be carried thereby to an inoperative position over and upon the handles of the plow, and a spring device adapted to bear downwardly on said rod in the operative position of the latter.

5. A drag attachment for plows, embodying a sectional jointed drag rod adapted to be attached to a plow, means for securing said sectional rod to the plow and adapted to permit the rod as a whole to be raised at its rear end and swung inwardly, and the jointed connection between the sections of the rod permitting one section to be moved forwardly upon the rocking of the other section, and a drag device carried by one section of said rod.

6. A drag attachment for plows, comprising a sectional rod, a frame pivotally connected to one section and supporting the other section for a limited axial movement of the latter in the frame, and a drag device carried by said last named section.

7. A drag attachment for plows, comprising a sectional drag rod, a frame pivotally mounted in one section of the rod, the other section of the rod being mounted for an axial movement in said frame, means carried by said frame for yieldingly limiting said movement of the section, and a drag device carried by said section.

In testimony whereof, I affix my signature in presence of two witnesses.

JAMES E. BURTON. [L. S.]

Witnesses:
 A. D. CRUTCHFIELD,
 LLOYD OSBORNE.